United States Patent Office 2,891,331
Patented June 23, 1959

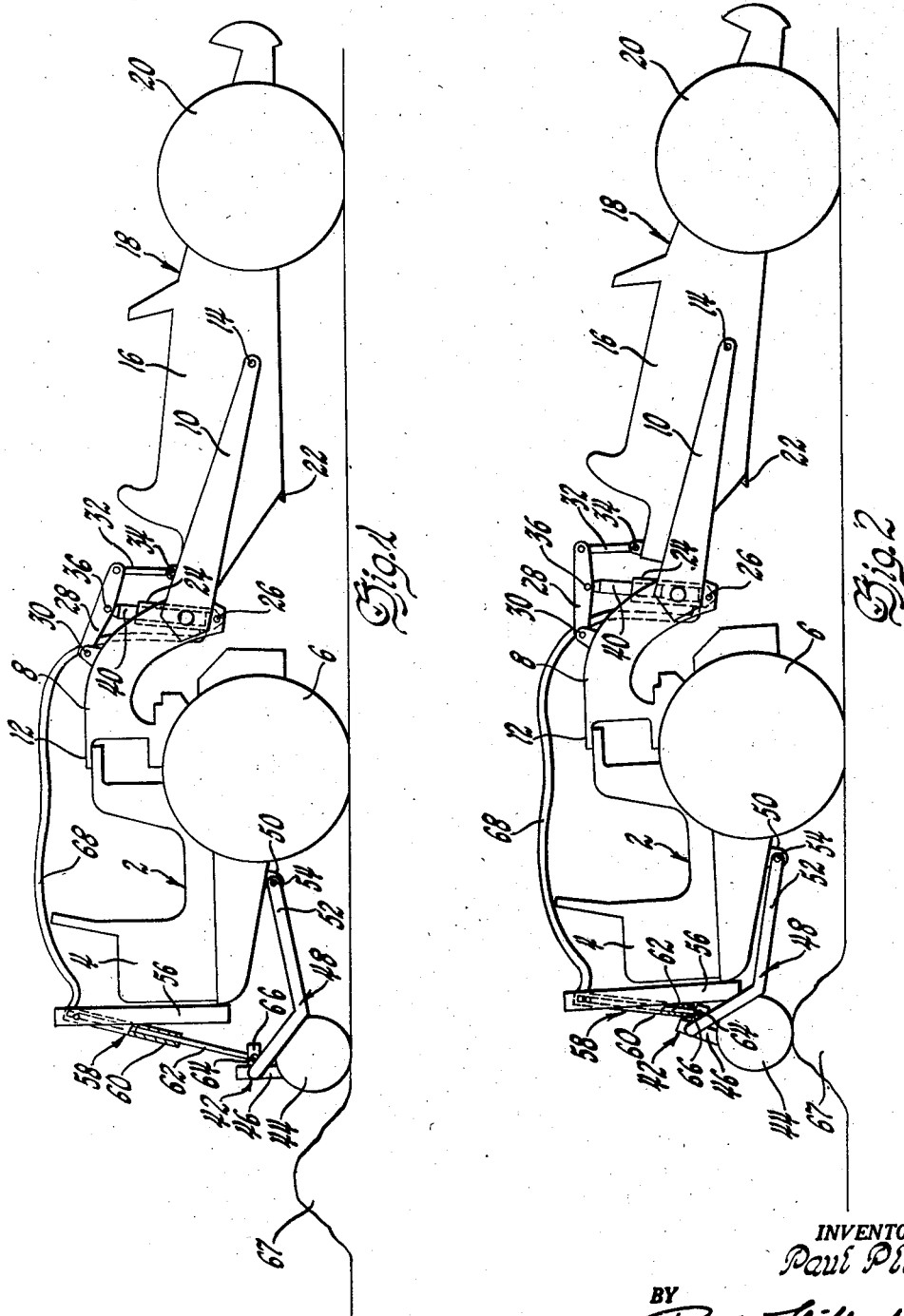

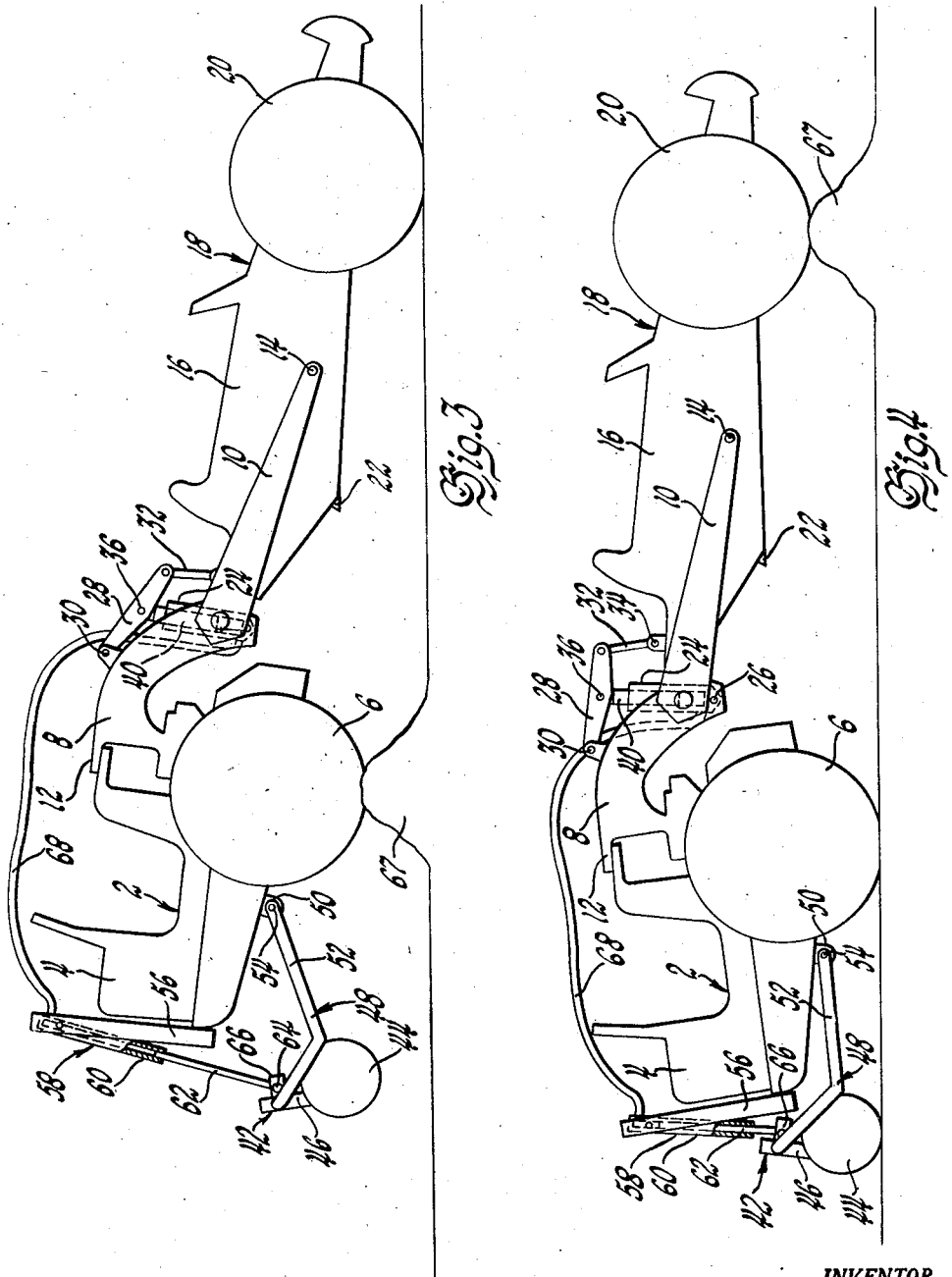

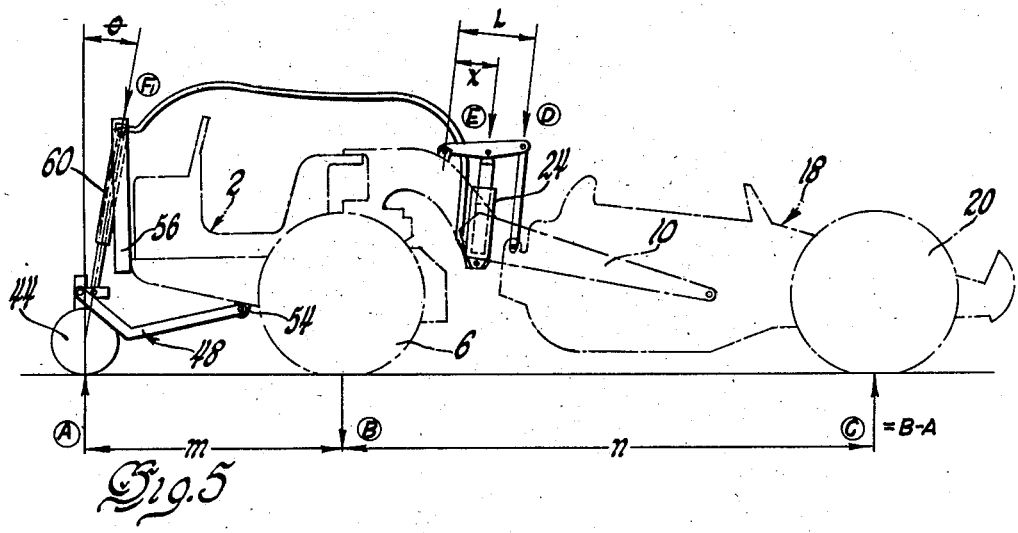
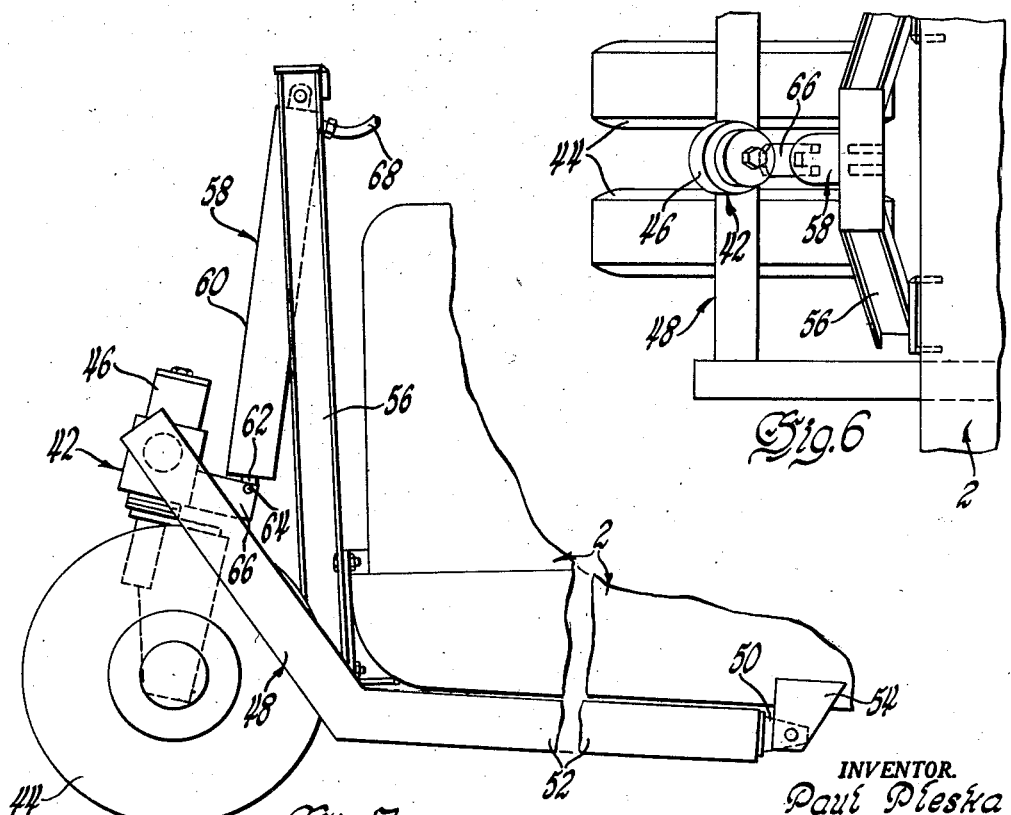

2,891,331
TRANSPORT DOLLY

Paul Pleska, Lyndhurst, Ohio, assignor to General Motors Corporation, Detroit, Mich., a corporation of Delaware Application April 11, 1956, Serial No. 577,527

17 Claims. (Cl. 37—124)

This invention relates to four-wheel scrapers of the type including a two-wheel tractor articulably connected to a two-wheel scraper bowl structure. More particularly, the invention relates to a dirigible ground engaging structure associated with the tractor or trailer to effect redistribution of normal axle loads on the four-wheel structure.

As used hereinafter, the term four-wheel scrapper is intended to mean a combination tractor and trailer assembly comprising a two-wheel tractor having articulably connected thereto a trailer type two-wheeled scraper bowl structure. The tractor power plant is normally overhung forwardly of its wheels while the scraper bowl extend forwardly of its wheels. The tractor and trailer are connected on a horizontal axis intermediately of the bowl by means of a fork type draw bar, the forward end of which is so mounted on the tractor as to permit steering thereof relative to the trailer. A suitable device, usually a hydraulic jack, is interposed between the draw bar and the trailer bowl to regulate the relative inclinations of the tractor and trailer about the horizontal axes passing through their wheel centers. This type of self-powered scraper has become increasingly popular due to its versatility and maneuverability especially under adverse operating conditions.

However, although the foregoing and numerous other advantages are obtained under actual operating conditions, four-wheel machines nevertheless present a substantial problem to operators when it is necessary to move equipment over paved roads on which axle load limitations exist. Thus, in the case of a typical 18 cubic yard capacity scraper, the axle loading on the tractor axle, even when the machine is empty, usually exceeds the maximum axle load limitation imposed in most states. As a result in the past users of this type of equipment have found it necessary to resort to the expensive and time consuming operation of transporting their machines on special multi-wheeled trailers, an expedient which especially in cases where the vehicle must travel only a very short distance over improved highways, seriously affects economical operations.

An object of the present invention is to provide an auxiliary ground engaging wheeled dolly structure operatively associated with the tractor-trailer combination to effect redistribution of the vehicle weight to bring the maximum axle loading within permissible limits for highway operation.

Another object is to provide a device of the stated character which utilizes inherent lever action of the articulated structure to accomplish load redistribution.

A further object is to provide a device of the stated character wherein load redistribution is accomplished by a closed hydraulic circuit interposed between the dolly and the tractor-trailer combination.

Sill another object is to provide a hydraulic system of the type referred to which is operative responsive to gravity forces acting on the scraper bowl structure.

Still a further object is to provide a dirigible dolly structure for a four-wheel scraper capable of reducing pitching movement of the vehicle as it progresses over irregular road surfaces, as well as accomplishing axle load redistribution.

Yet a further object is to provide an axle load distributing structure for a four-wheel scraper, the mechanism comprising a dirigible wheeled dolly articulably attached to one or both ends of the four-wheel scraper, a hydraulic mechanism effective to transfer a portion of the axle load of the scraper to the dolly, the hydraulic mechanism including an extensible strut between the dolly and the tractor, the extensible strut being connected in direct communicating relation with a second hydraulic strut arranged to respond to gravity forces acting on the trailer bowl structure.

A still further object is to provide an axle load distributing structure of the stated character wherein one of the two extensible struts normally functions as the bowl lift cylinder in excavating operations.

Yet another object is to provide a dolly load transfer arrangement of the type described which is capable of permitting substantial articulation between the dolly, tractor, and trailer, to accommodate irregularities in road surfaces, while maintaining the desired axle load redistribution on the dolly, tractor and trailer wheels, respectively.

Still a farther object is to provide a dolly structure of the type described which is readily mountable and demountable from the vehicle.

These and other objects, advantages and features of the invention will become more fully apparent as reference is had to the accompanying specification and drawings wherein:

Fig. 1 is a side elevational view of a four-wheel scraper in which the load redistribution dolly is shown in operating relationship therewith, and illustrating the relative positions of the dolly, tractor and trailer when the vehicle is progressing over a level road surface.

Fig. 2 is a view similar to Fig. 1 showing the relative positions and inclinations of the dolly, tractor and trailer when the dolly is progressing over an elevation in the road surface, while the tractor wheels and trailer wheels remain on a common level.

Fig. 3 is a view similar to Figs. 1 and 2 showing the relative positions and inclinations of the dolly, tractor and trailer, when the tractor wheels are progressing over a similar elevation in the road surface.

Fig. 4 is a view similar to Figs. 1, 2 and 3 showing the relative inclination of the parts when the trailer wheels are passing over the same elevation.

Fig. 5 is a diagrammatic side elevational view showing the operating principle of the load redistribution structure.

Fig. 6 is an enlarged fragmentary plan view of the dolly structure shown in Figs. 1 to 4; and Fig. 7 is an enlarged fragmentary side elevational view of the structure shown in Fig. 6.

Referring now to the drawings and particularly to Fig. 1, there is illustrated a four-wheel carry-type scraper in which the reference numeral 2 designates generally a two-wheel tractor in which the engine portion 4 is arranged in forwardly overhung relation relative to the driving wheels 6. Near its rearward end, tractor 2 has connected thereto a draw bar structure 8 having a pair of rearwardly projecting fork members 10. Draw bar structure 8 pivotally engages tractor 2 on a vertically extending king pin axis 12 which intersects the axis of rotation of tractor wheel 6 so that tractor 2 may be steered relative to draw bar 8 by hydraulic rams, not shown, or other suitable devices arranged to react between draw bar 8 and the tractor. At their rearward ends, forks 10 are pivotally connected at 14 intermediately on the respective side walls 16 of a trailer bowl structure 18. Bowl 18, in turn, is supported at its rearward end by rear ground engaging wheels 20. To regulate the elevational level of the transverse cutter blade 22 at the forward end of bowl 18 during normal excavating operations, there is provided a bowl lift cylinder 24 which is connected at its lower end intermediately on draw bar 8 by a pivot pin 26. Vertically spaced from lift cylinder 24 is a generally horizontally extending lever 28, the forward end of which is pivotally connected at 30 to the upper surface of draw bar 8. At its rearward end, lever 28 pivotally engages the upper end of a generally vertically extending lift rod 32, the lower end of which is pivotally connected at 34 to the forward extremity of bowl 18. Connected intermediately of lever 28 by a pivot pin 36 is the bowl lift cylinder piston 40. During excavating operations, bowl 18 and cutting edge 22 formed thereon are raised or lowered by introducing or exhausting hydraulic fluid from lift cylinder 24 by means of suitable controls, not shown. Thus, when fluid is introduced into cylinder 24, piston 40 is extended vertically, causing lever 28 to swing upwardly about pivot 30, which, in turn, applies a lifting force to bowl 18 through lift rod 32. Conversely, when fluid is exhausted from cylinder 24, blade 22 is lowered due to gravity acting upon the bowl mass. It will be understood that the weight distribution of the bowl 18 relative to its supporting wheels and the weight distribution of the tractor and its associated draw bar structure relative to their supporting wheels is such that, in the absence of lift cylinder 24, the force of gravity causes the forward end of the bowl and the rearward end of the tractor and draw bar structure to drop until cutter blade 22 rests on the ground. In the particular embodiment shown, the bowl lift cylinder positively resists the tendency of the bowl to drop but permits a free "floating" action upwardly from the selected elevated position.

In a basic four-wheel tractor and trailer of high cubic yard capacity, the axle loading on the tractor wheels 6 will usually be considerably beyond the maximum load limitations enforced in most States. For example, in a typical 18 cubic yard scraper, the axle loads on the tractor wheel 6 and the trailer wheels 20 are found to be approximately 45,000 lbs. and 23,000 lbs., respectively. Since the 45,000 lbs. axle load on the tractor wheels is well in excess of that permitted on most highways, such a vehicle may not be driven from one job to another on such highways.

In order to permit the operation of four-wheel scrapers on highways in accordance with the present invention, there is provided an auxiliary dolly structure 42 which in the illustrated embodiment is pivotally connected near the forward end of the tractor 2. It will be understood that a similar dolly may also be connected in a similar manner to the rear of bowl structure 18 where load distribution factors warrant the additional installation. As seen best in Figs. 6 and 7, dolly structure 42 comprises a dual wheel assembly 44 which is dirigibly connected to a generally vertically extending king pin structure 46. Kingpin structure 46, in turn, is rigidly secured at the forward end of a generally U-shaped supporting arm 48. The rearward end 50 of each leg 52 of arm 48 is pivotally connected on transversely aligned brackets 54 attached on the undersurface of tractor 2. A vertically extending pillar 56 is rigidly attached at the forward end of tractor 2. At its upper end, pillar 56 has pivotally connected thereto the upper end of a dolly strut assembly 58. Strut assembly 58 comprises a cylinder 60 and a piston rod 62, the lower end of which is pivotally connected at 64 to a bracket 66 which, in turn, is secured to king pin structure 46. When it is desired to place the dolly 42 in operation, a hydraulic line 68 is arranged to communicate between the interior of cylinder 60 and the interior of the bowl lift cylinder 24. Additional hydraulic fluid is then introduced into cylinder 24 by the engine driven hydraulic pump, not shown, until the cutting edge 22 of bowl structure 18 is raised sufficiently to provide adequate ground clearance for transporting a vehicle. Since the dolly strut cylinder 60 and bowl lift cylinder 24 form a closed circuit, additional hydraulic fluid must be added to fill the interior of cylinder 60 and the interior of hydraulic line 68 before lift cylinder piston 40 is effective to lift cutter blade 22 to the proper elevation. After the requisite amount of fluid has been added, any fluid exhausted from one cylinder must be received by the other. Accordingly, the dolly, tractor, and trailer each assume the angular position shown in Fig. 1 when the vehicle is resting on level ground, since the gravity urged tendency of the bowl 18 to drop downwardly requires that fluid be exhausted from cylinder 24. Inasmuch as hydraulic line 68 and cylinder 60 are already completely filled, dropping of bowl 18 requires that dolly wheels 44 also be displaced downwardly. However, since the dolly wheels are already on the ground, no fluid can be exhausted from cylinder 24 and the dolly, tractor and trailer must retain the respective inclination shown.

It will be evident, however, that a part of the weight of the bowl 18 acting on piston 40 is transferred to piston 62 of dolly strut 42. Hence, part of the weight originally borne by tractor wheels 6 is now supported by dolly wheels 42. Although the dolly, tractor and trailer assume the positions shown in Fig. 1 when the vehicle is on level ground, if the vehicle is driven over an irregularity in the road, such as shown at 67, the dolly wheels 44, tractor wheels 6 or trailer wheels 20 may rise within certain design limitations to accommodate the irregularity.

As seen in Fig. 2, when dolly wheels 44 encounter obstruction 67, piston 62 rises in cylinder 60 causing the fluid therein to be forced through line 68 into cylinder 24. The addition of fluid into cylinder 24 causes extension of piston 40 which, in turn, lifts bowl 18 by the mechanical force applied by lever 28 and lift rod 32. Hence, momentarily the tractor section tilts slightly downwardly at its forward end, while the trailer section tilts upwardly at its forward end against the gravity force acting thereon until the dolly wheels pass the obstruction 67.

Fig. 3 illustrates the change in angular inclination of dolly 42, tractor 2 and trailer 18 when the tractor wheels 6 reach the obstruction 67. Under these circumstances, the entire tractor rises to permit wheels 6 to clear obstruction 67 which, in turn, allows dolly wheels 44 remain on the ground or drop as far as is permitted by the design limitations of strut assembly 58. This, in turn, permits entrance of additional hydraulic fluid into cylinder 60 from cylinder 24. Accordingly, the front end of bowl 18 is permitted to drop relative to tractor 2. However, since tractor 2 momentarily occupies an elevation above the normal road surface, the cutter blade 22 of bowl 18 maintains at least the amount of clearance originally established for level road operation.

In Fig. 4, the vehicle has progressed to a point where the trailer wheels 20 are surmounting obstacle 67. Under these circumstances, elevation of wheels 20 tends to cause the forward end of tractor 2 to tilt downwardly since the piston 40 seeks to recede into cylinder 24 but cannot because downward tilting of tractor 2, of course, requires that piston 62 of dolly strut 58 recede into cylinder 56. Therefore, piston 62 tends to force fluid from cylinder 60 into cylinder 24, while piston 40 simultaneously tends to force fluid flow in the opposite direction. However, since the tendency of piston 40 to cause fluid flow out of cylinder 24 results solely from the force of gravity acting upon scraper bowl 18, the latter functions merely as a balancing mass, the weight of which is overcome by the hydraulic force produced by piston 62 receding in cylinder 60. Hence, the dolly, tractor and trailer assume the inclinations shown in Fig. 4. When the trailer wheels 20 return to ground level, the dolly wheels are free to move downwardly relative to tractor 2 and permit piston 62 to withdraw from cylinder 60, at which time the force of gravity acting on bowl 18 returns the entire structure to the relative arrangement originally established in Fig. 1.

It will now be seen that the present invention contemplates a closed circuit hydraulic system incorporating two hydraulic cylinders, the respective displacement ratio of which bears a calculated relationship to the mechanical tilting ratio of the bowl structure and tractor. In practice, it has been found that the fluid displacement ratio between the bowl lift cylinder 24 and dolly strut cylinder 60 should be roughly proportional to the mechanical tilting ratio between the front edge of the bowl 18 and the front edge of the tractor 2. Thus, in the illustrated embodiment, the fluid displacement ratio between cylinder 24 and 60 is approximately 3.17:1, while the mechanical tilting ratio between the front of bowl 18 and the front of tractor 2 is approximately 3.9:1. By fluid displacement ratio, it is meant that a given linear movement of piston 40 will displace 3.17 times as much fluid as will be displaced by corresponding linear movement of piston 62. By mechanical tilting ratio it is meant that 3.9 inches of downward movement of the forward edge of bowl 18 causes a 1 inch rise of the forward edge of tractor 2. It will, of course, be understood that the fluid displacement ratio is not necessarily limited to that given in connection with the illustrated embodiment but may vary considerably depending entirely upon the degree of axle load transfer desired and the tolerance to road irregularities which it is desired to accommodate. Thus, in the illustrated embodiment the invention accomplishes an axle load distribution of approximately 13,200 lbs. on the dolly, 28,800 lbs. on the tractor axle and 27,900 lbs. on the scraper bowl axle. In the absence of the dolly, the axle load distribution is approximately 45,600 lbs. on the tractor axle and 23,200 lbs. on the scraper axle. With respect to the second factor, the structure of the illustrated embodiment tolerates an 18 inch rise by the dolly wheels while the tractor and trailer wheels remain on the ground, a 7 inch rise of the tractor wheels while the dolly and trailer wheels remain on the ground, and a 43 inch rise of the trailer wheels while the dolly and tractor wheels remain on the ground. In practice, it has been found desirable to provide a relatively high dolly obstacle capacity to permit traversing high curbs, etc. and so avoid danger of damage to the dolly strut. It is, however, to be understood that uniform obstacle capacity for the dolly and tractor wheels may easily be attained by proper proportioning of the structure.

Although, as has been stated previously, the broad advantages of the invention may be realized by adhering to a fluid displacement and mechanical tilting ratio which are roughly proportional, it is possible to precisely calculate the load transfer function of the invention as applied to a given vehicle and thus permit design of a structure having exactly predictable load transfer characteristics. To that end there follows below a procedure by which it is possible to determine the required diameter of cylinder 60 necessary to produce the known needed reduction of tractor axle weight. Assuming that the basic scraper is a four-wheel vehicle of a general type shown in dotted lines in Fig. 5.

(1) Compute the downward force D from the mass moment of bowl.

(2) Let B equal required known weight reduction. (The difference between original axle loading and known axle load limitation.)

(3) Determine upward force A by summation of moments and vertical forces in order to obtain the required known weight reduction at B.

$$\Sigma MC \; Bn = A(m+n)$$

$$A = \frac{Bn}{(m+n)}$$

$$\Sigma V \text{ forces } A + (-B) + C = 0$$

Then $$C = B - A$$

where C is increase of load on ground at rear wheels (4) Let L equal the overall length of lever 28 and X the length of lever 28 between pivot 30 and the pivot 36.

Solving for E (the downward force on cylinder 24):

$$DL = EX$$

$$E = \frac{DL}{X}$$

Let F equal the known area of bowl lift cylinder 24.
Let P equal the unknown hydraulic pressure in cylinders 24 and 60.
Then $$P = \frac{E}{F}$$

$$P = \frac{DL}{XF}$$

Let $F_1$ equal the unknown hydraulic strut force at angle $\theta$ required to give known upward force A.
Let G equal the unknown area of strut cylinder 60.
Then $$F_1 = \frac{A}{\cos \theta} \qquad F_1 = PG$$

$$\frac{A}{\cos \theta} = PG$$

$$G = \frac{A}{\cos \theta (P)}$$

$$G = \frac{A}{\cos \theta}\left(\frac{XF}{DL}\right)$$

Since the effect of the present invention in reducing axle loading on the tractor wheels is accompanied by a moderate increase in axle loading on the trailer wheels, it will be apparent that the application of a single dolly to a given four-wheel scraper might, while accomplishing the desired axle load reduction on the tractor wheels, might produce an increase in axle load on the trailer wheels sufficient to bring the trailer axle load above the maximum limits. In this event, however, it is only necessary to apply a second dolly at the rear of the trailer in substantially the same manner as shown at the front of the tractor. The total vehicle weight will then be distributed between the front dolly, tractor axle, trailer axle, and rear dolly.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a four-wheel scraper of the type including a two-wheeled tractor and a two-wheeled trailer articulably connected to said tractor about a horizontal axis, means for varying the relative inclination of said tractor and trailer about said axis, a wheeled dolly adjustably connected to said tractor, and adjustable means responsive to movement of said last mentioned means for varying the vertical level of said wheeled dolly.

2. In a four-wheel scraper of the type including a two-wheeled tractor and a two-wheeled trailer articulably connected to said tractor about a horizontal axis, means for varying the relative inclination of said tractor and trailer about said axis, a wheeled dolly connected to said tractor, and hydraulic means responsive to movement of said last mentioned means for varying the vertical level of said wheeled dolly.

3. In a four-wheel scraper of the type including a two-wheeled tractor and a two-wheeled trailer articulably connected to said tractor about a horizontal axis, power means for varying the relative inclination of said tractor and trailer about said axis, a wheeled dolly connected to said tractor, and hydraulic means responsive to movement of said last mentioned means for varying the vertical level of said wheeled dolly.

4. In a four-wheel scraper of the type including a two-wheeled tractor and a two-wheeled trailer articulably connected to said tractor about a horizontal axis, hydraulic power means for varying the relative inclination of said tractor and trailer about said axis, a wheeled dolly connected to said tractor, and hydraulic means responsive to movement of said last mentioned means for varying the vertical level of said wheeled dolly.

5. In a four-wheel vehicle of the type including a first two-wheeled portion and a second two-wheeled portion articulably connected about a horizontal axis, a dolly structure connected to one end of said vehicle, and extensible means disposed between one of said two-wheeled portions and said dolly for transferring a portion of the axle load from said two-wheeled portion to said dolly, and means operatively connected to said extensible means and responsive to relative tilting of said portions for actuating said extensible means.

6. In a four-wheel vehicle of the type including a first two-wheeled portion and a second two-wheeled portion articulably connected about a horizontal axis, a dolly structure connected to one end of said vehicle, and fluid pressure operated extensible means disposed between one of said two-wheeled portions and said dolly for transferring a portion of the axle load from said two-wheeled portion to said dolly, and means operatively connected to said extensible means and responsive to relative tilting of said portions for actuating said extensible means.

7. In a four-wheel vehicle of the type including a first two-wheeled portion and a second two-wheeled portion articulably connected about a horizontal axis, a dolly structure connected to one end of said vehicle, and fluid pressure operated extensible means disposed between one of said two-wheeled portions and said dolly for transferring a portion of the axle load from said two-wheeled portion to said dolly, and fluid pressure means operatively connected to said extensible means and arranged to respond to relative tilting of said portions to regulate the length of said extensible means.

8. In a four-wheel vehicle of the type including a two-wheeled tractor and a two-wheeled scraper articulably connected about a horizontal axis, means disposed between said tractor and said scraper for varying the relative inclination thereof about said axis, a wheeled dolly structure pivotally connected to said tractor, and means for transferring a portion of the axle load from said two-wheeled tractor to said dolly, said means comprising a fluid pressure responsive extensible member disposed between said tractor and said dolly structure, said first-named means being operatively connected to said extensible member to regulate the length of the latter in response to relative articulation of said tractor and scraper about said axis.

9. In a four-wheel vehicle of the type including a two-wheeled tractor and a two-wheeled scraper articulably connected about a horizontal axis, means disposed between said tractor and said scraper for varying the relative inclinations thereof about said axis, said means including a hydraulic cylinder assembly, a wheeled dolly pivotally connected to said tractor and extending forwardly therefrom, means for transferring a portion of the axle load from said tractor to said dolly, said means comprising a fluid pressure responsive extensible member operatively disposed between said tractor and said dolly structure, and means connecting said hydraulic cylinder in communicating relation with said fluid pressure responsive extensible member whereby fluid pressure in said cylinder is transmitted to said extensible member.

10. In combination, a two-wheeled tractor having a rearwardly overhanging draw bar, a two-wheeled scraper having a bowl portion forwardly displaced relative to its wheels, means connecting said draw bar to said bowl structure on a horizontal axis displaced forwardly from said scraper wheels, power means mounted on said draw bar and adapted to raise and lower said bowl structure relative to the ground, a dolly structure pivotally connected to said tractor and extending forwardly therefrom, said dolly structure including at least one dirigibly mounted wheel, a fluid pressure responsive extensible member connected between said dolly structure and said tractor, and means associated with said power means for introducing fluid pressure into said extensible member to cause a portion of the axle load on said tractor to be transferred to said dirigible wheel, said power means being so arranged as to respond to mass moment forces acting on said tractor and scraper.

11. In combination, a two-wheeled tractor having a rearwardly overhanging draw bar, a two-wheeled scraper having a bowl portion forwardly displaced relative to its wheels, means connecting said draw bar to said bowl structure on a horizontal axis displaced forwardly from said scraper wheels, power means reacting between said draw bar and said bowl to raise and lower said bowl structure relative to the ground, a dolly structure pivotally connected to said tractor and extending forwardly therefrom, said dolly structure including at least one dirigibly mounted wheel, a fluid pressure responsive extensible member connected between said dolly structure and said tractor, and means associated with said power means for introducing fluid pressure into said extensible member to cause a portion of the axle load on said tractor to be transferred to said dirigible wheel, said power means being so arranged as to respond to mass moment forces acting on said tractor and scraper.

12. In combination, a two-wheeled tractor having a rearwardly overhanging draw bar, a two-wheeled scraper having a bowl portion forwardly displaced relative to its wheels, means connecting said draw bar to said bowl structure on a transverse horizontal axis displaced forwardly from said scraper wheels, a first hydraulic cylinder assembly reacting between said draw bar and said bowl to raise and lower said bowl structure relative to the ground, an auxiliary dolly structure pivotally connected to said tractor and extending forwardly therefrom, said dolly structure including dirigibly mounted wheels, a second hydraulic cylinder assembly arranged to react between said dolly structure and said tractor, and means connecting said first and second cylinder assemblies in communicating relation whereby forces acting on said first cylinder are transmitted to said second cylinder to cause a portion of the axle load on said tractor to be transferred to said dirigible wheels.

13. In combination, a two-wheeled tractor having a rearwardly overhanging draw bar, a two-wheeled scraper having a bowl portion forwardly displaced relative to its wheels, means connecting said draw bar to said bowl structure on a transverse axis displaced forwardly from said scraper wheels, a first hydraulic cylinder assembly reactable between said draw bar and said bowl to raise and lower said bowl structure relative to the ground, an auxiliary dolly structure pivotally connected to said tractor and extending forwardly therefrom, said dolly structure including dirigibly mounted wheels, a second hydraulic cylinder assembly arranged to react between said dolly structure and said tractor, and means forming a closed hydraulic circuit between said first and second cylinder assemblies whereby forces acting on said first cylinder are transmitted to said second cylinder to cause a redistribution of the axle load on said tractor and scraper wheels to said dolly, tractor and scraper wheels.

14. In combination, a two-wheeled tractor having a rearwardly overhanging draw bar, a two-wheeled scraper having a bowl portion forwardly displaced relative to its wheels, means connecting said draw bar to said bowl structure on a transverse axis displaced forwardly from said scraper wheels, a first hydraulic cylinder assembly reactable between said draw bar and said bowl to raise and lower said bowl structure relative to the ground, a dolly structure pivotally connected to said tractor and extending forwardly therefrom, said dolly structure including dirigibly mounted wheels, a second hydraulic cylinder assembly arranged to react between said dolly structure and said tractor, and means for forming a closed hydraulic circuit between said first and second cylinder assemblies, whereby fluid pressure in said first cylinder generated by gravity forces acting on said bowl are transmitted to said second cylinder causing the latter to exert a downward force on said wheel dolly effective to reduce the axle load on said tractor axle.

15. In combination, a two-wheeled tractor having a rearwardly overhanging draw bar hinged thereto on a vertical axis, a two-wheeled scraper having a bowl portion forwardly displaced relative to its wheels, means connecting said draw bar to said bowl on a transverse axis displaced forwardly from said scraper wheels whereby to establish a predetermined mechanical tilting ratio between the forward end of the tractor and the forward end of the scraper, a first hydraulic cylinder assembly reactable between said draw bar and said bowl to raise and lower said bowl relative to the ground, a dolly structure pivotally connected to said tractor and extending forwardly therefrom, a pair of dirigibly mounted wheels on said dolly structure, a second hydraulic cylinder assembly reacting between said dolly structure and the forward end of said tractor, and means forming a closed hydraulic circuit between said first and second cylinder assemblies whereby mass moment forces acting on said first cylinder are transmitted to said second cylinder to impart a downward force on said dolly sufficient to substantially reduce the axle load on said tractor wheels, the respective diameters of said hydraulic cylinders being such as to establish a ratio approximately proportional to said mechanical tilting ratio.

16. In combination, a two-wheeled tractor having a longitudinally extending draw bar hinged thereto on a vertical axis, a two-wheel scraper having a bowl portion forwardly displaced relative to its wheels, means connecting said draw bar to said bowl on a transverse axis spaced forwardly from said scraper wheels, a lever hinged at one end to said draw bar, a link operatively connecting the opposite end of said lever with said bowl, a first hydraulic cylinder assembly reactable between said draw bar and an intermediate point on said lever to raise and lower said bowl relative to the ground, an auxiliary dolly structure pivotally connected to said tractor and extending forwardly therefrom, a dirigibly mounted wheel on said dolly structure, a second hydraulic cylinder assembly reactable between said dolly structure and the forward end of said tractor, and means forming a closed hydraulic circuit between said first and second cylinder assemblies whereby mass moment forces acting on said first cylinder are transmitted to said second cylinder to impart a downward force on said dolly to substantially reduce the axle load on said tractor wheels, the diameter of said second cylinder being established substantially according to the equation $$G = \frac{A}{\cos\theta}\left(\frac{XF}{DL}\right)$$

the expressions in the equation having the meaning defined in the specification.

17. In combination, a vehicle comprising at least three supported portions, means connecting each supported portion in vertically articulable relation with the adjacent supported portion, ground engaging wheels for each of said supported portions, and fluid responsive means acting between one of said supported portions and the adjacent supported portion to transfer a portion of the axle loading on the ground engaging wheels of said adjacent portion to the ground engaging wheels of said first mentioned supported portion, said fluid responsive means being actuated by mass moment forces developed in part by the third articulated supported portion.

References Cited in the file of this patent

UNITED STATES PATENTS

| | | |
|---|---|---|
| 2,266,913 | Simmons | Dec. 23, 1941 |
| 2,345,313 | Armington et al. | Mar. 28, 1944 |
| 2,360,903 | Simmons | Oct. 24, 1944 |
| 2,496,515 | Bayes | Feb. 7, 1950 |
| 2,633,366 | Armington | Mar. 31, 1953 |
| 2,789,377 | Armington | Apr. 23, 1957 |

FOREIGN PATENTS

| | | |
|---|---|---|
| 668,250 | Great Britain | Mar. 12, 1952 |